Dec. 5, 1967  G. S. ROBERTS  3,356,251

MULTIPLE-USE STORAGE VESSEL

Filed Jan. 7, 1965

United States Patent Office 3,356,251
Patented Dec. 5, 1967

3,356,251
MULTIPLE-USE STORAGE VESSEL
George S. Roberts, Baton Rouge, La., assignor to Ethyl Corporation, New York, N.Y., a corporation of Virginia
Filed Jan. 7, 1965, Ser. No. 423,997
1 Claim. (Cl. 220—63)

ABSTRACT OF THE DISCLOSURE

A multiple-use liquid storage vessel including a rigid tank capable of confining a liquid. The vessel contains a plurality of separate, flexible, thin-wall collapsible containers adapted to hold a liquid. Each container substantially fills the interior of the vessel when filled with a liquid and compresses the empty containers against the wall or floor of the vessel. The containers may be made from plastic or rubber reinforced or non-reinforced materials. A single vessel may be used to store a plurality of different products at different times without danger of contamination of the products.

---

This invention relates in general to a storage or transport vessel for a liquid, more particular to a storage or transport vessel having a plurality of separate, flexible, thin wall, collapsible containers therein.

In storing and transporting liquid materials, it is often necessary that the same vessels, such as storage tanks, tank cars or tank trailers be used for dissimilar products. This requires that the storage or transport vessels be thoroughly cleaned when changing from one product service to another. Such cleaning requirements imposes additional cost and also increases the time the particular vessels are out of service.

Corrosion in liquid storage and transport vessels has been a problem in the chemical and petroleum industry for many years. Special alloy steels and other metals are often required to provide satisfactory storage vessels which will not be adversely affected by the corrosive nature of many common liquid materials. Barrels and cans having baked-on plastic linings have come into use for the storage and transportation of certain materials which are adversely affected by direct contact with steel containers. However, baked-on or catalytically polymerized plastic lining for large storage and transport vessels are difficult to apply and quite expensive. Industry is still seeking an economical and satisfactory manner of corrosion-proofing large storage transport vessels.

Therefore, it is an object of this invention to provide a liquid storage or transport vessel that may be used for a number of dissimilar products without cleaning between product changes.

It is another object of this invention to provide a storage or transport vessel capable of transporting a number of dissimilar corrosive materials at different times without corroding the walls of the vessel.

It is still another object of this invention to provide a storage or transport vessel that is adapted for use with a number of different products without cross-contamination of the products.

It is also an object of this invention to provide a storage and transport vessel which can be quickly and cheaply repaired.

The foregoing, and other aims, objectives, and advantages of the invention as may appear hereinafter, are realized in a multiple-use liquid storage vessel including a rigid tank capable of confining a liquid and a plurality of separate, flexible, thin-wall, collapsible containers within the vessel, each of the containers being of such size and shape to substantially fill the interior volume of the vessel when the container is filled with a liquid.

Figure 1:
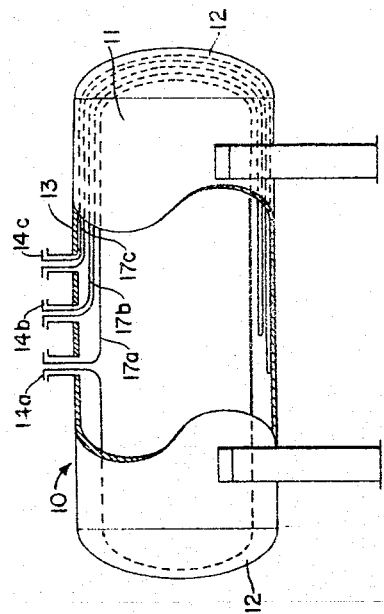
Figure 2:
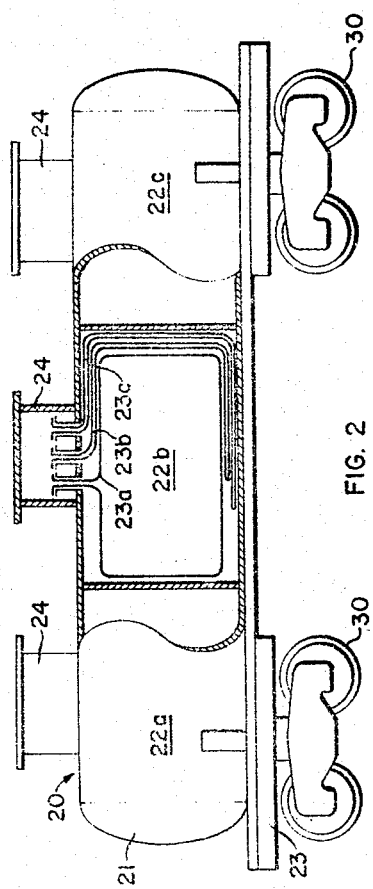
Figure 3:
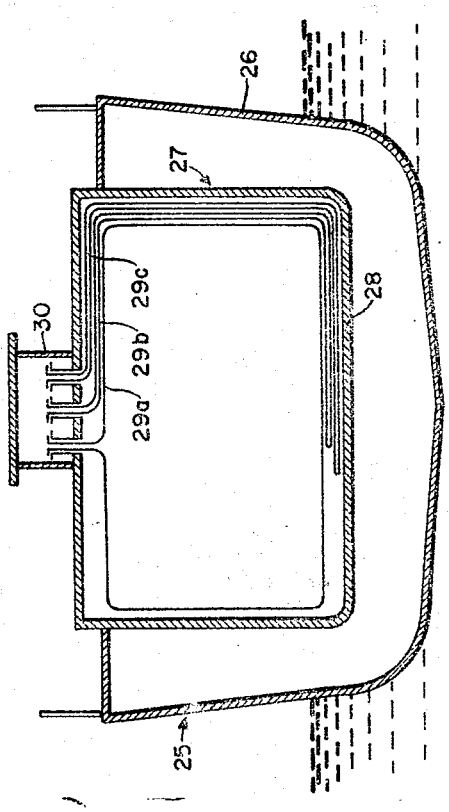

In the drawing:
FIGURE 1 is an elevational view, with portions shown in cross section, of a storage vessel constructed in accordance with the present invention;
FIGURE 2 is an elevational view, with portions shown in cross section, of a compartmented railway tank car constructed in accordance with the present invention;
FIGURE 3 is a cross-sectional view of a tanker containing storage compartments constructed in accordance with the present invention; and
FIGURE 4 is an enlarged view of the inlet-outlet port construction used in the vessels shown in FIGURES 1, 2, and 3.

Referring to the drawing, particularly to FIGURE 1, there is shown a cylindrical storage vessel, generally designated by the numeral 10. The storage vessel includes a cylindrical tank 11 having convex end portions 12. The top surface 13 of the tank is provided with three inlet-outlet ports 14a, 14b, and 14c. Each of the inlet-outlet ports is defined by a cylindrical upstanding pipe section 15 as may be more clearly seen in FIGURE 4. The pipe section may be integrally formed with the storage tank upper wall or it may be attached thereto by welding or other suitable means. A flange 16 is attached to the upper end of the pipe section 15. Referring now again to FIGURE 1, the storage tank contains three flexible, thin wall, collapsible, thermoplastic container liners 17a, 17b and 17c. Each of the container liners is of such a size and shape to completely conform to the interior walls of the cylindrical tank 11 when the liner is full of liquid. The container liners are separated from each other and are not attached to the cylindrical tank 11 except for the portion of the liner in contact with the flanges at the inlet-outlet ports 14a, 14b and 14c. The container liners are so constructed and arranged that when one liner has been filled with a liquid product the other two liners will be collapsed and pressed firmly against the walls of the cylindrical tank 11. Thus it can be seen that the storage vessel 10 provides three separate containers 17a, 17b, and 17c which may be used to store different liquid products at different times without any danger of a cross-contamination. The tank 10 may contain more or less than three liners depending upon the number of different products which will be stored in the vessel.

Figure 4:
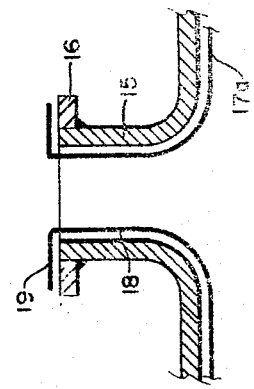

Referring now to FIGURE 4, the container liner 17a is provided with a cylindrical neck portion 18 which extends through the pipe section 15 and terminates in an integrally formed gasket portion 19 which in turn seats against the flange 16. The flanged portion of an inlet-outlet valve (not shown) or a flange end of a filling or emptying line (not shown) may be attached to the flange 16 to permit filling and emptying of each one of the container liners. The lower portion of the pipe section 15 is preferably flared outwardly, as seen in FIGURE 4, in order that no sharp corners will be present which may puncture the container liners.

Referring now to FIGURE 2, another embodiment of the present invention is shown in a railway tank car, designated generally by the FIGURE 20. The tank car includes a cylindrical compartmented tank section 21 having three storage compartments 22a, 22b and 22c. The tank section 21 is supported in a frame 23 which in turn is mounted on car trucks 30. The center compartment 22b contains three flexible thermoplastic container liners 23a, 23b, and 23c. Each of the liners has an integrally formed neck portion which extends through openings in the upper portions of the tank car similar to those shown in FIGURE 4. Compartments 22a and 22c of the railway tank car contain thermoplastic flexible container liners similar to those shown in the center compartment 22b. Each tank compartment has a dome portion 24 to protect the inlet-outlet ports for the respective compartments.

Referring now to FIGURE 3, there is shown a cross section of a tanker compartment such as may be present in an ocean-going vessel. The tanker designated generally by the numeral 25 includes a hull portion 26 which contains a generally rectangular liquid storage compartment designated generally by the numeral 27. The storage compartment 27 includes a steel vessel 28 which contains three thermoplastic flexible compartment liners 29a, 29b and 29c. Each of the liners has a neck portion on its top surface which extends through inlet-outlet openings provided in the top of the vessel 28. A dome cover 30 covers the inlet-outlet ports. The flexible container liners 29a, 29b and 29c function in a manner similar to the liners described hereinbefore in reference to the storage vessel depicted in FIGURES 1 and 2. The liners each have a size and shape such that they will individually conform to the interior volume of the vessel 28 when they are individually filled with a liquid.

The various embodiments of the storage vessel of the present invention described hereinbefore are designed to transport or store only one type of liquid material at any one time. The one container liner in use will be expanded by the liquid to substantially fill the interior volume of the storage vessel. The flexible container liners that are not in use will be collapsed by the weight of the liquid in the full liner and will be pressed against the walls of the particular storage compartment or vessel.

The individual liners may be filled and emptied by a number of different techniques. In one manner of filling a container liner, the liner is inflated using compressed air or inert gas to expand the liner to substantially the full volume of the vessel. Then the liquid product may be pumped into the expanded liner to displace the air or inert gas. The liquid product may be removed from the liner by inserting a dip pipe through the neck opening of the liner and pumping the liquid from the liner with a suction pump. Another method of emptying a container liner of its liquid contents is by pumping water or other suitable fluid into one of the collapsed empty liners thereby displacing the liquid product.

One of the advantages of the present invention is that it permits a single transport or storage vessel to be used for a number of different products without the necessity of cleaning the storage compartment when changing from one product to the next. The same tank car may contain, say for example gasoline, on one trip and lubricating oil on its return trip. When the tank car arrives at its destination, the gasoline may be conveniently unloaded by displacing with the lubricating oil, which is pumped into a separate container liner, thereby simultaneously loading the vessel for its return trip.

Another advantage of the storage and transport vessel of the present invention is provided in the ease with which new liners can be inserted in the various storage compartments. The inlet-outlet ports should be designed to have a sufficient diameter to permit the insertion and removal of a complete container liner. Thus when a particular liner becomes old or is punctured, it may be conveniently replaced simply by pulling the old liner out through the storage vessel neck opening and inserting a new liner in place thereof.

Since the point of greatest weakness in the thermoplastic container liners is the neck portion, it is desirable to reinforce the neck opening by making this portion of an increased thickness of plastic material.

The container liners used in the present invention may be made from any suitable material that is chemically and physically resistant to the liquid product to be transported or stored in the particular vessel. In general, the preferred material for making the liners is a suitable flexible, strong, solvent resistant thermoplastic material. One material particularly suited for use in making the liners of the present invention is polyethylene. Polyethylene liners of suitable thickness may be used for transporting and storing basic and acidic materials without any danger of contamination by contact with the steel storage or transport vessel. However, polyethylene is in general not suitable for use in vessels wherein hydrocarbon solvents such as naphtha, gasolines, oils and other petroleum products are transported or stored. Another preferred material for use in making the flexible liners is flexible polyvinyl chloride. Liners prepared from polyvinyl chloride film are satisfactory for use in the transportation and storage of alcohols, acids, alkalies, petroleum such as gasoline, naphtha, lube oils, and other similar chemical products. The polyethylene liners particularly adapted for use in the present invention may be made without using any plasticizers or other additives in the material. However, to provide the necessary flexibility, liners of polyvinyl chloride must be made from PVC formulated with suitable plasticizers, stabilizers and lubricants. A particularly suited formulation for flexible PVC is as follows: 100 parts of a medium molecular weight polyvinyl chloride such as Diamond 450 or Geon 103 EP, 40–80 parts of dioctyl phthalate plasticizer, 8 parts of tribasic lead sulfate as a stabilizer, ½ part paraffin wax lubricant, and 10–20 parts "Atomite" (a form of calcium carbonate) as a filler.

The polyethylene or plasticized polyvinyl chloride container liners may be made by welding sheet material together to form a flexible container of the same size as the vessel to be lined. Another method for making the container liner is to fuse a thin layer of powdered or granular thermoplastic on the walls of a mold form having the same dimensions as the vessel in which the liner is to be used. After fusing, the lining is stripped from the mold. Slush molding techniques may also be used to form the container liners. Suitable flexible thermoplastic container liners should have a wall thickness within the range from about 0.040 inch to about 0.100 inch. The thickness required for the wall of the liner will be determined largely by the size of the vessel to be lined and to some extent by the particular material from which the liner is constructed.

While liners made from polyethylene and flexible polyvinyl chloride will find most general application, other materials may be used to fabricate the liners. A particularly suitable material for a flexible liner for storing or transporting organic solvents is plasticized polyvinyl alcohol. PVA liners are particularly resistant to organic solvents and to a wide variety of gases, however, its use is restricted to substantially anhydrous systems since the plastic has a low tolerance for water. Other suitable materials are specialty rubbers such as neoprene. In addition to liners made from unsupported thermoplastic materials, the liners may be made from impregnated fabrics such as cotton cloth, fiber glass cloth or other suitable woven material that has been given a coating of a plastic material. The fabric reinforced liners are in general more useful in transporting or storing viscous or high density liquids wherein relatively high pressures are required to move the fluids. They are less desirable due to their greater bulk and lower compressibility as compared to a liner made from a non-supported thermoplastic material such as polyethylene or flexible polyvinyl chloride. Impregnated or internally coated fabric liners may be conveniently prepared using a PVC plastisol. A suitable formulation for a PVC plastisol is as follows: 100 parts of a polyvinyl chloride polymer such as Geon 121 or Diamond 71A, 40–80 parts of dioctyl phthalate plasticizer, and 4 parts of a barium-calcium laurate stabilizer such as Advance Chemical Company's "KCB." The plastisol is normally stirred in a suitable mixture prior to coating the substrate. The substrate may be coated by any of the convenient methods such as dip coating, doctor blade, spread coating, or reverse roller coating. After coating, the fabric is normally heated for about 10 minutes at a temperature of 350° C. to solidify the plastisol into an impervious film on the surface of the substrate.

In general, sharp corners and rough surfaces are to be avoided in constructing the storage and transport vessels in order to minimize points of abrasion which may puncture or weaken the flexible liners. In the construction of a welded vessel, it is desirable to make all welds on the exterior surface of the vessel in order that the interior surface of the vessel will present a smooth surface to the plastic liners. If it is found necessary to make interior welds, they should be ground down to give a smooth interior surface to the vessel.

The foregoing disclosure and description of the invention is illustrative and explanatory thereof and, in light thereof, other modifications will be apparent to those skilled in the art. Therefore, the present invention is to be limited only by the scope of the appended claims.

What is claimed is:

A multiple-use liquid storage vessel having a rigid tank capable of confining a liquid and a plurality of separate, flexible, thin-wall, collapsible containers within said tank, each of said containers being of a size and shape to substantially fill the interior volume of said tank when said container is filled with liquid, each of said containers having a neck portion attached to their top walls and adapted to extend through an opening provided in the top of said vessel, the improvement comprising: said neck portion terminating in an integral gasket portion received between a flange provided at the upper end of a pipe section joined to said vessel and surrounding said opening and a flange provided on the end of an inlet-outlet conduit, said pipe section having an outwardly flared lower end joining said vessel whereby abrasion of the neck portion of said container is minimized.

References Cited

UNITED STATES PATENTS 2,764,950   10/1956   Finnell.

THERON E. CONDON, *Primary Examiner.*

JAMES B. MARBERT, *Examiner.*